United States Patent
Gu et al.

(10) Patent No.: US 8,044,109 B2
(45) Date of Patent: Oct. 25, 2011

(54) POLYURETHANE FOAMS CONTAINING SILICONE SURFACTANTS

(75) Inventors: Zhihong Gu, Shanghai (CN); Lijun Feng, Saint Laurent (CA); Wenkai Zhang, Shanghai (CN); Paul Austin, Williamstown, WV (US)

(73) Assignee: Momentive Performance Materials Inc., Albany, NY (US)

( * ) Notice: Subject to any disclaimer, the term of this patent is extended or adjusted under 35 U.S.C. 154(b) by 587 days.

(21) Appl. No.: 12/080,546

(22) Filed: Apr. 3, 2008

(65) Prior Publication Data

US 2009/0253817 A1    Oct. 8, 2009

(51) Int. Cl.
*C08G 77/46* (2006.01)
*C08G 18/00* (2006.01)
*C08J 9/00* (2006.01)

(52) U.S. Cl. .......................... 521/112; 521/170
(58) Field of Classification Search .......... 521/170, 521/172, 174, 112
See application file for complete search history.

(56) References Cited

U.S. PATENT DOCUMENTS

| | | | |
|---|---|---|---|
| 3,980,688 A | | 9/1976 | Litteral et al. |
| 4,687,786 A | | 8/1987 | Kollmeier et al. |
| 4,814,409 A | | 3/1989 | Blevins, II et al. |
| 5,145,879 A | * | 9/1992 | Budnik et al. ................. 521/112 |
| 5,182,310 A | * | 1/1993 | Skorpenske et al. .......... 521/116 |
| 5,306,737 A | | 4/1994 | Burkhart et al. |
| 5,432,206 A | | 7/1995 | Stanga et al. |
| 5,807,903 A | * | 9/1998 | Stanga et al. ................. 521/112 |
| 5,830,970 A | | 11/1998 | Cobb et al. |
| 5,981,613 A | | 11/1999 | Cobb et al. |
| 5,990,187 A | | 11/1999 | Boinowitz et al. |
| 7,183,330 B2 | * | 2/2007 | Furlan et al. .................. 521/112 |
| 2004/0127672 A1 | * | 7/2004 | Heinz et al. ..................... 528/44 |

* cited by examiner

*Primary Examiner* — Mark Eashoo
*Assistant Examiner* — Peter F Godenschwager
(74) *Attorney, Agent, or Firm* — Joseph E. Waters

(57) ABSTRACT

The present invention relates to polyurethane foam prepared from a polyurethane foam-forming reaction mixture possessing a silicone copolymer surfactant, methods for making the surfactant, and a process for preparing low density polyurethane foams.

20 Claims, No Drawings

POLYURETHANE FOAMS CONTAINING SILICONE SURFACTANTS

BACKGROUND OF THE INVENTION

The present invention relates to polyurethane foams. In particular, the present invention relates to a polyurethane foam-forming reaction mixture possessing a silicone copolymer surfactant, methods for making the surfactant, and a process for preparing low density polyurethane foams.

Polyurethane foam is typically prepared by generating a gas during polymerization of a liquid reaction mixture generally comprised of a polyester or polyether polyol, a polyisocyanate, a surfactant, catalysts, one or more blowing agents and other auxiliary agents. The gas causes foaming of the reaction mixture to form a cellular structure. The surfactant stabilizes the polyurethane foam structure.

In current polyurethane technology silicone surfactants are used to assist and control nucleation sites for polyurethane foam cell formation, compatibilization of the chemical components and stabilization of cells in the developing polyurethane foam.

Flexible polyurethane foams are commercially prepared as slabstock foam or in molds. Some slabstock foam is produced by pouring the mixed reactants in large boxes (discontinuous process), while other foam is prepared in a continuous manner by deposition of the reacting mixture on a paper lined conveyor. The foam rises and cures as the conveyor advances and the foam is cut into large blocks as it exits the foam machine. Some of the uses of flexible slabstock polyurethane foams include: furniture cushions, bedding, and carpet underlay.

Flexible foam formulations usually include e.g., a polyol, a polyisocyanate, water, optional blowing agent (low boiling organic compound or inert gas, e.g., $CO_2$), a silicone type surfactant, and catalysts. Flexible foams are generally open-celled materials, while rigid foams usually have a high proportion of closed cells.

Polyurethane foams are produced by reacting a di- or polyisocyanate with compounds containing two or more active hydrogens, optionally in the presence of blowing agent(s), catalysts, silicone-based surfactants and other auxiliary agents. The active hydrogen-containing compounds are typically polyols, primary and secondary polyamines, and water. Two major reactions are promoted by the catalysts among the reactants during the preparation of polyurethane foam, gelling and blowing. These reactions must proceed simultaneously and at a competitively balanced rate during the process in order to yield polyurethane foam with desired physical characteristics.

Reaction between the isocyanate and the polyol or polyamine, usually referred to as the gel reaction, leads to the formation of a polymer of high molecular weight. This reaction is predominant in foams blown exclusively with low boiling point organic compounds. The progress of this reaction increases the viscosity of the mixture and generally contributes to crosslink formation with polyfunctional polyols. The second major reaction occurs between isocyanate and water. This reaction adds to urethane polymer growth, and is important for producing carbon dioxide gas which promotes foaming. As a result, this reaction often is referred to as the blow reaction.

Historically, numerous grades of polyurethane foams were blown with chlorofluorocarbon (CFC) based blowing agents to reduce foam density, control foam firmness, and cool the foams to minimize discoloration, degradation, and possible foam ignition. Environmental issues regarding ozone depletion in connection with certain CFC's has led to the Montreal Protocol, CFCs. As a result, the polyurethane foam industry has tried to achieve the same foam grades and quality produced using alternate blowing agents (ABAs). Many different ABAs have been evaluated in flexible foam including alkyl carbonates, acetone, methylene chloride, carbon tetrachloride, trichloroethane and pentanes. Recently, supplemental added inert gases such as carbon dioxide ($CO_2$) have been effectively employed as part of the blowing agent for flexible polyurethane foams.

Currently silicone surfactants are used to emulsify, nucleate and stabilize the polyurethane foam. This is well known in the literature. The silicone surfactants currently used for a variety of applications, contain for example, either all ethylene oxide polyether pendants reacted to the siloxane copolymer backbone or all ethylene oxide/propylene oxide pendants.

Low density slabstock polyurethane foams are produced widely, and economical methods of producing such foams include using large amounts of blowing agents and fillers. However, the increased levels of auxiliary blowing agent and water used in the production of low density flexible slabstock polyurethane foam cause inner foam splits or collapse. Also, the use of increased levels of inorganic fillers for the production of slabstock polyurethane foams, often results in inner foam splits and coarse cell structure.

Prior art silicone surfactants used in the preparation of low density polyurethane foams can cause coarse cell structure and/or show low potency, (especially when density is less than 10 kg/m³). Also, conventional silicone surfactants used to prepare polyurethane foams having large quantities of fillers, i.e., more than 50 weight percent of polyols, can present production problems, e.g., foam collapse and coarse cells. Thus, not all silicone surfactants are suitable for these foam systems. As such, high potency silicone surfactants are required to stabilize the foam composition until the product-forming chemical reaction completes sufficiently, the foam is self-supporting, and it does not suffer objection-able collapse and coarse cells. Silicone surfactants of this invention can provide more uniform and finer cells, and have more stable foaming processing than other current commercial surfactants.

The present invention provides polyurethane foams with silicone surfactants and addresses the problem of coarse cell structure and/or low surfactant potency.

SUMMARY OF THE INVENTION

The present invention provides polyurethane foam obtained from a foam-forming composition comprising a silicone copolymer surfactant having the formula:

$$MD_xD'_yM,$$

wherein,
M represents $(CH_3)_3SiO_{1/2}$, or $(CH_3)_2RSiO_{1/2}$,
D represents $(CH_3)_2SiO_{2/2}$,
D' represents $(CH_3)RSiO_{2/2}$,
x+y is 50 to 150; y is at least 3; the ratio x/y is 3 to 15; and R is a polyether independently selected from the group consisting of:
  i) at least one polyoxyalkylene moiety having the formula:
     —$C_nH_{2n}O(C_2H_4O)_a(C_3H_6O)_bR'$ and possessing a number average molecular weight from 2,300 to 5,500, wherein n is 2 to 4, a is a number such that the oxyethylene residue constitute 20 to 60 percent by the weight of the alkylene oxide residues of the polyoxyalkylene polyether, b is a number such that the propylene oxide residue constitute 80 to 40 percent by the weight of the alkylene oxide residues of the polyoxyalkylene polyether, and R' represents an alkyl group having 1 to 4 carbon atoms or —C(O)CH$_3$;

ii) at least one polyoxyalkylene moiety having the formula: —C$_{n'}$H$_{2n'}$O(C$_2$H$_4$O)$_{a'}$(C$_3$H$_6$O)$_{b'}$R' and possessing a number average molecular weight from 800 to 2,200, wherein n' is 2 to 4, a' is a number such that the oxyethylene residues constitute 20 to 60 percent by weight of the alkylene oxide residues of the polyoxyalkylene polyether, b' is a number such that the propylene oxide residue constitute 80 to 40 percent by the weight of the alkylene oxide residues of the polyoxyalkylene polyether, and R' represents an alkyl group having 1 to 4 carbon atoms or —C(O)CH$_3$; and, iii) at least one polyoxyalkylene moiety having the formula: —C$_{n''}$H$_{2n''}$O(C$_2$H$_4$O)$_{a''}$(C$_3$H$_6$O)$_{b''}$H and possessing a number average molecular weight of 1,400 to 2,300, n'' is 2 to 4, a'' is a number such that the oxyethylene residues constitute 20 to 60 percent by weight of the alkylene oxide residues of the polyoxyalkylene polyether, and b'' is a number such that the propylene oxide residue constitute 80 to 40 percent by the weight of the alkylene oxide residues of the polyoxyalkylene polyether, with the proviso that MD$_x$D'$_y$M has at least one of component (iii).

The present invention provides a polyurethane foam from a polyurethane foam-forming composition having enhanced emulsification properties which provide stable foaming processing, improved foam scrap ratios and outstanding performance between cell fineness and density distribution as compared to current low density polyurethane foams prepared with commercially available surfactants. The silicone surfactants of this invention provide uniform and finer foam cell formation and exhibit more stable foaming processing than other current commercial surfactants.

Also provided is a process for preparing the silicone copolymer surfactant comprising reacting at least one polysiloxane having terminal or pendent Si—H groups with polyoxyalkylene polyethers having a terminal carbon to carbon double bond group

DETAILED DESCRIPTION OF THE INVENTION

Other than in the working examples or where otherwise indicated, all numbers expressing amounts of materials, reaction conditions, time durations, quantified properties of materials, and so forth, stated in the specification and claims are to be understood as being modified in all instances by the term "about."

It will also be understood that any numerical range recited herein is intended to include all sub-ranges within that range and any combination of the various endpoints of such ranges or subranges.

It will be further understood that any compound, material or substance which is expressly or implicitly disclosed in the specification and/or recited in a claim as belonging to a group of structurally, compositionally and/or functionally related compounds, materials or substances includes individual representatives of the group and all combinations thereof.

Accordingly, it is an object of this invention is to provide siloxane polyether copolymers containing pendent hydroxyl terminated polyether groups. Another object of the present invention is to provide nonhydrolyzable silicone surfactants which can offer improved emulsification of urethane reaction blends. A further object of this invention is to provide certain silicone surfactants with high potency in the preparation of in low density flexible polyurethane foams. Still another object of this invention is to provide surfactants that achieve uniform and fine cell structure in polyurethane foams.

The silicone polyether copolymer surfactants of the present invention possess a mixture of pendant groups consisting of at least one of each of the ethylene oxide/propylene oxide pendant groups, i.e., components (i), (ii), and (iii) described herein, attached to the same siloxane backbone, of which one is hydroxyl terminated. The surfactants are useful in emulsifying the materials used to manufacture polyurethane foam.

According to an embodiment of the invention, the silicone copolymer surfactant has the general formula:

wherein,
M represents (CH$_3$)$_3$SiO$_{1/2}$, or (CH$_3$)$_2$RSiO$_{1/2}$,
D represents (CH$_3$)$_2$SiO$_{2/2}$,
D' represents (CH$_3$)RSiO$_{2/2}$,
x+y is 50 to 150; y is at least 3; the ratio x/y is 3 to 15; and R is a polyether independently selected from the group consisting of:

i) at least one polyoxyalkylene moiety having the formula: —C$_n$H$_{2n}$O(C$_2$H$_4$O)$_a$(C$_3$H$_6$O)$_b$R' and possessing a number average molecular weight from 2,300 to 5,500, wherein n is 2 to 4, a is a number such that the oxyethylene residue constitute 20 to 60 percent by the weight of the alkylene oxide residues of the polyoxyalkylene polyether, b is a number such that the propylene oxide residue constitute 80 to 40 percent by the weight of the alkylene oxide residues of the polyoxyalkylene polyether, and R' represents an alkyl group having 1 to 4 carbon atoms or —C(O)CH$_3$;

ii) at least one polyoxyalkylene moiety having the formula: —C$_{n'}$H$_{2n'}$O(C$_2$H$_4$O)$_{a'}$(C$_3$H$_6$O)$_{b'}$R' and possessing a number average molecular weight from 800 to 2,200, wherein n' is 2 to 4, a' is a number such that the oxyethylene residues constitute 20 to 60 percent by weight of the alkylene oxide residues of the polyoxyalkylene polyether, b' is a number such that the propylene oxide residue constitute 80 to 40 percent by the weight of the alkylene oxide residues of the polyoxyalkylene polyether, and R' represents a divalent hydrocarbon having 1 to 4 carbon atoms or —C(O)CH$_3$; and, iii) at least one polyoxyalkylene moiety having the formula: —C$_{n''}$H$_{2n''}$O(C$_2$H$_4$O)$_{a''}$(C$_3$H$_6$O)$_{b''}$H and possessing a number average molecular weight of 1,400 to 2,300, n'' is 2 to 4, a'' is a number such that the oxyethylene residues constitute 20 to 60 percent by weight of the alkylene oxide residues of the polyoxyalkylene polyether, and b'' is a number such that the propylene oxide residue constitute 80 to 40 percent by the weight of the alkylene oxide residues of the polyoxyalkylene polyether, with the proviso that MD$_x$D'$_y$M, has at least one component (iii).

According to one embodiment of the invention, in order to provide the polyoxyalkylene moiety having the general formula: —C$_n$H$_{2n}$O(C$_2$H$_4$O)$_a$(C$_3$H$_6$O)$_b$R, i.e., component (i), possessing a number average molecular weight from 2,300 to 5,500, a is an integer that ranges from about 10.5 to about 75, and b is an integer that ranges from about 16 to about 76. Likewise, according to another embodiment of the invention, to provide the polyoxyalkylene moiety having the general formula: —C$_n$H$_{2n}$O(C$_2$H$_4$O)$_a$(C$_3$H$_6$O)$_b$R', i.e., component (ii), possessing a number average molecular weight from 800 to 2,200, a' is an integer that ranges from about 4 to about 30, and b' is an integer that ranges from about 11 to about 30. In still another embodiment of the invention, the hydroxyl terminated polyoxyalkylene moiety, i.e., component (iii), possessing a number average molecular weight of 1,400 to 2,300, a" is an integer that ranges from about 6 to about 32, and b" is an integer that ranges from about 10 to about 32.

The silicone copolymer surfactants of the present invention can be prepared by several synthetic approaches including staged addition of the polyethers. Moreover, the polyoxyalkylene polyether components are well known in the art and/or can be produced by any conventional process. For instance, hydroxy terminated polyoxyalkylene polyethers which are convenient starting materials in the preparation of the terpolymer can be prepared by reacting a suitable alcohol with ethylene oxide and propylene oxide (1,2-propylene oxide) to produce the polyoxyalkyene polyethers of the desired molecular weights. Suitable alcohols are hydroxy alkenyl compounds, e.g., vinyl alcohol, allyl alcohol, methallyl alcohol and the like. In general, the alcohol starter preferably is placed in an autoclave or other high-pressure vessel along with catalytic amounts of a suitable catalyst, such as sodium hydroxide, potassium hydroxide, other alkali metal hydroxides, or sodium or other alkali metals Further details of preparation are set forth in, for example, U.S. Pat. No. 3,980,688. The entire contents of which are herein incorporated by reference.

The above-described alcohol-oxide reaction produces a monohydroxy end-blocked polyoxyalkylene polyether in which the other end-blocking group is an unsaturated olefinic group consisting of either a allyl or methallyl or vinyloxy group. These polyethers may be converted to monoalkenyloxy-terminated polyoxyalkylene polyethers by capping the hydroxy terminal group of said monohydroxy end-blocked poly(oxyethyleneoxypropylene) copolymers by any conventional means.

The blend number average molecular weight of the overall polyoxyalkylene polyether containing substituents R in the compositions is from 2,050 to 2,350 and the OH-terminated polyoxyalkylene group constitutes 10 to 60 percent by the weight of the overall polyoxyalkylene polyether.

The inventive polysiloxane-polyoxyalkylene branched copolymers can be synthesized by known procedures. The nonhydrolyzable Si—C linked copolymers are prepared by reacting polysiloxane, having terminal or pendent Si—H groups, with polyoxyalkylene polyethers having a terminal carbon to carbon double bond group, the molar amount of overall polyoxyalkylene polyethers is in excess of 40 percent per Si—H group of the polysiloxane so as to promote a complete reaction. Platinum catalysts in particular are suitable for accelerating this addition reaction, such as $H_2PtCl_6.6H_2O$, while the amount of catalyst need only be a catalytic amount. The temperature of the reaction largely depends on the reactants involved and the polysiloxane-polyoxyalkylene branched copolymers desired to be produced.

It is to be understood that the polysiloxane-polyoxyalkylene branched copolymers of this invention can contain small amounts of Si—H groups owing to the incomplete reaction thereof with polyoxyalkylene reactant. The polysiloxane-polyoxyalkylene branched copolymers are typically mixed with a diluent such as dipropylene glycol (DPG) to control product viscosity and aid in processing.

More specifically, the present invention relates to the use of these silicone surfactants as cell stabilizers in a process for preparing low density flexible slabstock polyurethane foams, i.e., polyurethane foam having a density of less than 20 $kg/m^3$, and preferably, polyurethane foaming having a density between 6 and 14 $kg/m^3$.

In general, polyurethane foams are formed from reactive compositions comprising an organic isocyanate component reactive with an active hydrogen-containing polyol component(s), a surfactant, and a catalyst.

The suitable polyols for preparing the polyurethane foam of the present invention are those having an average number of hydroxyl groups per molecule of at least slightly above 2 and, typically from about 2.1 to about 3.5 hydroxyl groups per molecule and a number average molecular weight of from 100 to 6000, preferably a number average molecular weight of from 2500 to 4000. Included among the useful polyols are polyether diols and triols, polyester diols and triols and hydroxyl-terminated polyolefin polyols such as the polybutadiene diols. Other useful polyols include copolymers of polymeric materials grafted onto the main polyol chain such as, for example, SAN (styrene/acrylonitrile) or AN (acrylonitrile) grafted onto polyether polyols, commonly referred to as copolymer polyols, polyols derived from naturally occurring materials such as castor oil, chemically-modified soybean oil or other chemically-modified fatty acid oils and polyols resulting from the alkoxylation of such naturally occurring materials as castor oil and soybean.

Preferred polyols are the polyether diols and triols, particularly those derived from one or more alkylene oxides, phenyl-substituted alkylene oxides, phenyl-substituted alkylene oxides and/or ring-opening cyclic ethers such as ethylene oxide, propylene oxide, styrene oxide, tetrahydrofuran, and the like, advantageously having a number average molecular weight of from 1000 to 6000 and preferably a weight average molecular weight from 2500 to 4000. Examples of such polyether diols include, for example, DOW Voranol-3010 Voranol is a registered trademark of DOW.

Suitable polyisocyanates include, toluenediisocyanate (TDI), including 2,4 and 2,6 isomers and isocyanate prepolymers of TDI made from the reaction of TDI with polyols, or other aromatic or aliphatic isocyanates, and the index of the foam is typically 60 to 130. According to one embodiment of the present invention, the polyisocyanate (b) can be a hydrocarbon diisocyanate, (e.g. alkylenediisocyanate and arylene diisocyanate), such as toluene diisocyanate, diphenylmethane isocyanate, including polymeric versions, and combinations thereof. In yet another embodiment of the invention, the polyisocyanate (b) can be isomers of the above, such as methylene diphenyl diisocyanate (MDI) and 2,4- and 2,6-toluene diisocyanate (TDI), as well as known triisocyanates and polymethylene poly(phenylene isocyanates) also known as polymeric or crude MDI and combinations thereof. Non-limiting examples of isomers of 2,4- and 2,6-toluene diisocyanate include Mondur® TDI, Papi 27 MDI and combinations thereof. Or mixtures of the polyisocyanates listed herein above.

One or more blowing agents, either of the physical and/or chemical type, can be included in the reaction mixture. Typical physical blowing agents include methylene chloride, acetone, water or $CO_2$ which are used to provide expansion in the foaming process. A typical chemical blowing agent is water, which reacts with isocyanates in the foam, forming reaction mixture to produce carbon dioxide gas. These blowing agents possess varying levels of solubility or compatibility with the other components used in the formation of polyurethane foams. Developing and maintaining a good emulsification when using components with poor compatibility is critical to processing and achieving acceptable polyurethane foam quality.

Other optional component(s) are known in the art and include fillers, e.g., inorganic fillers or combinations of fillers. Fillers may include those for density modification, physical property improvements such as mechanical properties or sound absorption, fire retardancy or other benefits including those that may involve improved economics such as, for example, calcium carbonate (limestone) or other fillers that reduce the cost of manufactured foam, aluminum trihydrate or other fire retardant fillers, barium sulfate (barite) or other high-density filler that is used for sound absorption, microspheres of materials such as glass or polymers that may also further reduce foam density. Fillers of high aspect ratio that are used to modify mechanical properties such as foam stiffness or flexural modulus that would include: man-made fibers such as milled glass fiber or graphite fiber; natural mineral fibers such as wollastonite; natural animal such as wool or plant fibers such as cotton; man-made plate-like fillers such as shattered glass; natural mineral plate-like fillers such as mica; possible addition of any pigments, tints or colorants.

Optional components(s) include any of those known in the art in known amounts and include other polyhydroxyl-terminated materials such as those having 2 to 8 hydroxyl groups per molecule and a molecular weight from 62 to 500 that function as crosslinkers or chain extenders. Examples of useful chain extenders having two hydroxyl groups include dipropylene glycol, diethylene glycol, 1,4-butanediol, ethylene glycol, 2,3-butanediol and neopentylglycol. Crosslinkers having 3 to 8 hydroxyl groups include glycerine, pentaerythritol, mannitol, and the like.

Additionally, the invention contemplates the use of organic flame retardants; antiozonants, antioxidants; thermal or thermal-oxidative degradation inhibitors, UV stabilizers, UV absorbers or any other additive(s) that when added to the foam-forming composition will prevent or inhibit thermal, light, and/or chemical degradation of the resulting foam. Also contemplated for use herein are any of the known and conventional biostatic agents, antimicrobial agents and gas-fade inhibiting agents.

Typical formulations for flexible slabstock polyurethane foam, with or without filler, would include the following Formulations (I)-(IV).

Preparation of low density flexible slabstock polyurethane foams: The following flexible slabstock polyurethane foams have a density of about 14.0 kg/m$^3$ and were made in accordance with the following Formulation (I):

| FORMULATION (I) | |
|---|---|
| Materials* | pphp (wt.) |
| Dow V-3010 | 100.0 |
| Distilled Water | 5.5 |
| Methylene Chloride | 15 |
| NIAX ® D-20 | 0.46 |
| NIAX ® A-200 | 0.2 |
| TDI 80/20 (112 Index) | 69.44 |
| Silicone Surfactant | 0.48-1.2 |

*Polyol V-3010 is a polyol produced from glycerol and a mixture 84 weight percent propylene oxide and 16 weight percent ethylene oxide. V-3010 has a hydroxyl number of 56.
TDI 80/20 is a mixture of 80 weight percent 2,4 toluene diisocyanate and 20 weight percent 2,6 toluene diisocyanate.
D-20 is stannous octoate from Momentive Performance Materials Corporation.
A-200 is an amine catalyst produced by Momentive Performance Materials Corporation.

Silicone surfactants are present in an amount sufficient to stabilize the foam, but foam with appropriate recession so as to see the difference, that is, the potency of silicone surfactant.

Preparation of ultra low density flexible slabstock polyurethane foams: The following flexible slabstock polyurethane foams have a density of about 8.5 kg/m$^3$ and were made in accordance with the following Formulation (II) and procedure:

| FORMULATION (II) | |
|---|---|
| Materials* | pphp (wt.) |
| Dow V-3010 | 100.0 |
| Distilled Water | 7.0 |
| Methylene Chloride | 44.0 |
| NIAX ® D-20 | 1.5 |
| NIAX ® A-230 | 0.25 |
| TDI 80/20 (115 Index) | 89.0 |
| Silicone Surfactant | 1.0-3.0 |

*Remark: A-230 is a balanced amine catalyst produced by Momentive Performance Materials Corporation.

Preparation of inorganic filler flexible slabstock polyurethane foams at middle density: The following inorganic filler flexible slabstock polyurethane foams having a density of about 20.0 kg/m$^3$ were made in accordance with the following Formulation (III), in which 50 pphp light CaCO$_3$ (pphp (wt) parts per hundred parts polyol), i.e., "filler," was added.

| FORMULATION (III) | |
|---|---|
| Materials | pphp* (wt.) |
| Dow V-3010 | 100.0 |
| Distilled Water | 5.5 |
| Methylene Chloride | 15 |
| NIAX ® D-20 | 0.5 |
| NIAX ® A-200 | 0.2 |
| Light CaCO$_3$ | 50 |
| TDI 80/20 (112 Index) | 69.44 |
| Silicone Surfactant | 0.5-1.5 |

Preparation of inorganic filler flexible slabstock polyurethane foams at ultra low density: The following inorganic filler flexible slabstock polyurethane foams having a density of about 9.0 kg/m$^3$ and 30 pphp light CaCO$_3$ were made in accordance with the following Formulation (IV) and procedure:

| FORMULATION (IV) | |
|---|---|
| Materials | pphp* (wt.) |
| Dow V-3010 | 100.0 |
| Distilled Water | 7.0 |
| Methylene Chloride | 44.0 |
| NIAX ® D-20 | 1.5 |
| NIAX ® A-230 | 0.25 |
| Light CaCO$_3$ | 30 |
| TDI 80/20 (115 Index) | 89.0 |
| Silicone Surfactant | 1.0-3.0 |

The slab foaming procedure for Formulation (I) and Formulation (III) is as follows: 250.0 (+/−0.5) grams of Polyol Dow V-3010 was dispensed into a 32-ounce paper cup; 125.0 (+/−0.1) grams of light CaCO$_3$ was added to Formulation (III) only; surfactant was added to the V-3010 and mix thoroughly, temperature of the mixture was monitored and maintained between 22.5 and 23.5° C.; 14.25 (+/−0.05) grams of a pre-mixed solution of water and A-200 catalyst was added; Mix for three minutes with fillers or for fifteen seconds without fillers at 2000 RPM; 37.5 (+/−0.1) grams of methylene chloride was added to the cup; mixing continued for fifteen seconds at 2000 RPM; the agitator was stopped for three seconds while adding 1.250 (+/−0.005) grams of D-20 catalyst, using a one-cc syringe equipped with a 12-gauge needle, for dispensing catalyst; mixing continued for seven seconds and 173.6 (+/−0.5) grams toluene diisocyanate was added while agitator continued; agitation continued for seven additional seconds at 2000 rpm; the cup was removed from the foaming station; the contents were immediately poured into a 5 gallon cylinder mold, leaving the cup inverted and contents pouring for five seconds; the foam was allowed to react and rise at room temperature (23° C.); the maximum height of rise of the foam and height of rise after foam settling (recession) was recorded; the foam was left to stand until a total of three minutes from the time the mixing procedure began, then place in an oven at 115-120° C. for fifteen minutes; and the foam was removed from the oven and cooled for a minimum of ten minutes.

Slab foaming procedure for Formulation (II) and Formulation (IV) is as follows: 200.0 (±0.1) grams of V-3010 was dispensed into a 32-ounce paper cup; 60.0 (+/−0.1) grams of light CaCO3 was added to the V-3010 of formulation IV only; the surfactant was added into the mixture; the temperature of the solution monitored and maintained between 22.5° and 23.5° C.; 14.5 (±0.05) grams of a premixed solution of the water and A-230 were added to the mixture (Premixed ratio according the formulation); mixing continued for three minutes with filler or thirty seconds without fillers at 2000 rpm; after mixing for 3 minutes (filled foam) or after mixing 30 seconds (unfilled foam) while agitating mixture at 2000 rpm; immediately 88.0 (±0.5) grams of Methylene Chloride was added, followed immediately by 3.0 (±0.005) grams of D-20; mixing continued, and 178.0 (±0.5) grams of TDI was immediately added and mix for an additional 3 seconds; mixing was discontinued and the cup was removed from foaming station; the contents of the cup were immediately poured into a 35.0×35.0×15.0 centimeter cake box in the aluminum mold for 6 seconds and the foam was allowed to react and rise at room temperature (23° C.); the final height and recession was recorded by Sonar machine; the box was left to stand at room temperature for a total of 3 minutes from the time the methylene chloride was added; cardboard box was removed from aluminum mold and place in 110° to 120° C. oven for 10 minutes; the foam was removed from the oven and cooled for a minimum of ten minutes.

The foams were produced using virtually identical chemical formulations as indicated above with the primary difference between examples being the replacement of one surfactant composition with another depending on filled foam (i.e., containing filler) and unfilled foam.

Evaluation of the flexible slabstock foam with performance tests are as follows:

The described terms have the following meanings:

Maximum Rise Height: The maximum height in centimeters obtained during the rise of the foam.

Full Cure Height: The final height in centimeters of the foam after curing at room temperature for 16 to 24 hours.

Recession percent equals (Maximum Rise Height−Full Cure Height)*100/(Maximum Rise Height).

Air Flow: A foam sample having dimensions 5.1×5.1×2.5 cm taken from the same level and place of all comparative foams. These experiments were designed to directly compare critical processing characteristics of foam of approximately equivalent positions in the foam. Specifically, all of the foams were measured for air porosity using an IDM breathability apparatus and read air flow in standard cubic liters per minute.

Cell Count: visual comparison made between slices of foam (2 in×2 in.×¼ in.) Foams were compared to controls of varying cell structure quality. The relative cell structure scale spans from "very coarse" which is less than 7 cells/cm on average to "very fine" which represents greater than about 16-18 cells/cm on average. The other designations fall between these two extremes.

Density: Kg/m$^3$, the density of middle core and bottom of foam at the same level and dimensions.

EXAMPLES

Preparation of Polysiloxane-Polyoxyalkylene Branched Copolymers:

Preparation of Example 1 was as follows: Into a 500 ml four-necked flask fitted with a heating mantle, mechanical stirrer, thermometer and nitrogen blow-by were combined 164.40 grams of an allyl started, methyl endcapped polyoxyalkylene polymer (R) with an average molecular weight of about 2400 and containing about 40 weight percent oxyethylene groups and about 60 weight percent oxypropylene groups (designated herein as Polyether A); 19.8 grams of an allyl started, hydroxyl endcapped polyoxyalkylene polymer (R) with an average molecular weight of about 1500 and containing about 40 weight percent oxyethylene groups and about 60 weight percent oxypropylene groups (designated herein as Polyether B).

One drop of dibutylaminoethanol (DBAE) was added into polyoxyalkylene polyether by pipette and stirred. Then, 65.8 grams of a polyhydridosiloxane polymer having the average formula (M D$_{70}$ D'$_{5...0}$ M (Si—H Fluids)) was added to the pot. This mixture was heated to 85° C. with stirring for about 5 min, and 15 ppm Pt as H2PtCL6 dissolved in ethanol were added. After holding the pot contents at 85° C. for one hour, the Si—H content was measured at less than 0.1 mL/gr. This product, designated herein as surfactant Example 1, was clear, amber colored liquid.

Following the procedure of Example 1 the siloxane-polyether surfactants of Examples 6-12 and Comparative Examples 2-5 were prepared in the exact same manner with various combinations of polyethers as presented in Table 1:

TABLE 1

| Examples | Si—H Fluids(g) | *Polyether A (g) | Polyether B (g) | Polyether C (g) | Polyether D (g) | Polyether E (g) | Polyether F (g) | BAMW (g/mole) |
|---|---|---|---|---|---|---|---|---|
| Example 1 | 65.8 | 164.5 | 19.8 | 0 | 0 | 0 | 0 | 2200 |
| Comparative Example 2 | 65.8 | 164.5 | 0 | 19.8 | 0 | 0 | 0 | 2200 |
| Comparative Example 3 | 65.8 | 76.4 | 0 | 55 | 52.8 | 0 | 0 | 2200 |
| Comparative Example 4 | 65.8 | 76.4 | 19.8 | 35.2 | 52.8 | 0 | 0 | 2200 |

TABLE 1-continued

| Examples | Si—H Fluids(g) | *Polyether A (g) | Polyether B (g) | Polyether C (g) | Polyether D (g) | Polyether E (g) | Polyether F (g) | BAMW (g/mole) |
|---|---|---|---|---|---|---|---|---|
| Comparative Example 5 | 63.2 | 0 | 0 | 0 | 0 | 105.6 | 81.2 | 2200 |
| Example 6 | 63.2 | 0 | 19.2 | 0 | 0 | 105.6 | 62 | 2200 |
| Example 7 | 63.2 | 0 | 25.5 | 0 | 0 | 105.6 | 55.7 | 2200 |
| Example 8 | 63.2 | 0 | 32 | 0 | 0 | 105.6 | 49.2 | 2200 |
| Example 9 | 63.2 | 0 | 38.3 | 0 | 0 | 105.6 | 42.9 | 2200 |
| Example 10 | 63.2 | 0 | 81.2 | 0 | 0 | 105.6 | 0 | 2200 |
| Example 11 | 66.3 | 0 | 27.0 | 0 | 0 | 90.3 | 66.4 | 2050 |
| Example 12 | 60.3 | 0 | 24.4 | 0 | 0 | 119.6 | 45.7 | 2350 |

*Polyether A: $CH_2=CH-CH_2(C_2H_4O)_a(C_3H_6O)_bOCH_3$; EO/PO wt % = 2:3; $M_n \approx 2400$ g/mole
Polyether B: $CH_2=CH-CH_2(C_2H_4O)_{a'}(C_3H_6O)_{b'}OH$; EO/PO wt % = 2:3; $M_n \approx 1500$ g/mole.
Polyether C: $CH_2=CH-CH_2(C_2H_4O)_a(C_3H_6O)_bOCH_3$; EO/PO wt % = 2:3; $M_n \approx 1400$ g/mole.
Polyether D: $CH_2=CH-CH_2(C_2H_4O)_{a'}(C_3H_6O)_{b'}OH$; EO/PO wt % = 2:3; $M_n \approx 4000$ g/mole.
Polyether E: $CH_2=CH-CH_2(C_2H_4O)_a(C_3H_6O)_bOC(O)CH_3$; EO/PO wt % = 2:3; $M_n \approx 3800$ g/mole.
Polyether F: $CH_2=CH-CH_2(C_2H_4O)_a(C_3H_6O)_bOC(O)CH_3$; EO/PO wt % = 2:3; $M_n \approx 1400$ g/mole.
*(Polyether A is a blend of Polyether C and Polyether E).

Preparation of Flexible Slabstock Polyurethane Foam:

Additionally, Comparative Examples 6 and 7 were prepared with commercial surfactants NIAX® L-580 and NIAX® L-600, respectively. Silicone surfactant Example 1 and Comparative Examples 2-4, and 6-7 were used to prepare polyurethane foams of Formulation I. The results are displayed in Table 2 below.

TABLE 2

| Examples | Dosage of Surfactant (pphp) | Full Cure Height(cm) | Recession (%) | Cell structure Rating | Bottom Density (kg/m³) | Middle Density (kg/m³) |
|---|---|---|---|---|---|---|
| Comparative Example 6 (L-580) | 1.2 | 37.7 | 6.47 | Fine | 17.84 | 14.09 |
| Comparative Example 7 (L-600) | 1.2 | 38.4 | 5.55 | Moderate | 16.69 | 13.78 |
| Example 1 | 0.6 | 39.4 | 5.23 | fine | 17.00 | 13.70 |
| Comparative Example 2 | 0.6 | 38.1 | 7.82 | fine | 17.93 | 14.37 |
| Comparative Example 3 | 0.6 | 36.8 | 9.10 | fine | 18.9 | 14.09 |
| Comparative Example 4 | 0.6 | 37.8 | 8.33 | fine | 17.59 | 14.04 |

Niax L-580 and Niax L-600 are commercial silicone surfactants available from Momentive Performance Materials Corporation and contain no free hydroxyl functionality, Table 2 displays data, which shows that silicone surfactant Example 1 of the present invention compared with Comparative Examples 2-4 and 6-7 provides foams with high potency, but also provides fine cell structure and low bottom weight even at a usage level as low as 0.6 pphp (parts per hundred parts polyol V-3010).

Silicone surfactant Example 1 was diluted with dipropylene glycol (DPG) to 58 weight percent of active surfactant to 42 weight percent DPG, and labeled as Silicone surfactant Example 1-A as referenced in Table 3 below. Table 3 describes the surfactant performance of surfactant Example 1-A and was compared with Comparative Example 7 and Comparative Example 8 at 3 different dosage levels (0.8, 1.0, and 1.2 pphp) in Formulation (I) and at one dosage level (3 pphp) in Formulation (II). Comparative Example 8, i.e., B-8123, is a proprietary commercial silicone surfactants available from Evonik Corporation. In Table 3, three surfactants are given different usages 0.8/1.0/1.2 in formulation (I), moreover, ultra low density flexible slabstock foam is prepared by Formulation (II) for comparison.

TABLE 3

| Foam Formulation | Surf. | Dosage of Surf. (pphp) | Full Cure Height (cm) | Recession (%) | Air Flow | Cell Structure Rating | Bottom Density (kg/m³) | Middle Density (kg/m³) |
|---|---|---|---|---|---|---|---|---|
| (I) | Comparative Example 7 (L-600) | 0.8 | 38.1 | 6.9 | 9 | −Moderate | 18.62 | 14.58 |
| | Comparative Example 8 | 0.8 | 37 | 10.5 | 2.7 | −Moderate | 18.54 | 15.05 |

TABLE 3-continued

| Foam Formulation | Surf. | Dosage of Surf. (pphp) | Full Cure Height (cm) | Recession (%) | Air Flow | Cell Structure Rating | Bottom Density (kg/m³) | Middle Density (kg/m³) |
|---|---|---|---|---|---|---|---|---|
| | (B-8123) Example 1-A | 0.8 | 38.6 | 7.6 | 9.9 | −Moderate | 18.12 | 14.16 |
| | Comparative Example 7 (L-600) | 1.0 | 39 | 7.0 | 8.6 | −Moderate | 17.62 | 14.12 |
| | Comparative Example 8 (B-8123) | 1.0 | 38.4 | 7.6 | 2.6 | −Moderate | 18.77 | 14.61 |
| | Example 1-A | 1.0 | 39.6 | 5.8 | 9.7 | −Moderate | 17.58 | 14.13 |
| | Comparative Example 7 (L-600) | 1.2 | 38.4 | 5.5 | 9.1 | Fine | 17.16 | 13.61 |
| | Comparative Example 8 (B-8123) | 1.2 | 39.5 | 5.9 | 3.9 | Fine | 17.04 | 14.11 |
| | Example 1-A | 1.2 | 40.3 | 5.1 | 8.8 | Fine | 16.44 | 13.80 |
| (II) | Comparative Example 7 (L-600) | 3 | 20.1 | 8.0 | 2.5 | Moderate | 11.60 | 8.28 |
| | Comparative Example 8 (B-8123) | 3 | 20.5 | 4.29 | 1.4 | Coarse | 11.23 | 8.38 |
| | Example 1-A | 3 | 20.5 | 3.51 | 1.0 | Fine | 11.15 | 8.41 |

As is evident from the data presented in Table 3, surfactant Example 1-A of the invention produces a foam having excellent overall characteristics even at ultra low density formulation, such as high potency (full cure height), fine cell structure, low recession ratio and bottom weight.

Preparation of flexible slabstock polyurethane foam: The silicone surfactants of Examples 6-12 of Table 1, and Comparative Example 6 (i.e., NIAX® L-580) and Comparative Example 5, were evaluated in Formulation (I). Silicone surfactant Example 8-A was prepared from a blend of surfactant Example 8 from Table 1 and DPG at a 55 weight percent ratio of surfactant 8 with 45 weight percent with DPG, and was compared with the commercially available surfactants, i.e., Comparative Examples 6-8, in Formulation (II). The results are presented in Table 4 below.

TABLE 4

Formulation I and II

| Foam Formulation | Surfactant of Example | Dosage of Surfactant (pphp) | Full Cure Height (cm) | Recession (%) | Cell Structure Rating | Density (Kg/m³) |
|---|---|---|---|---|---|---|
| (I) | Comparative Example 5 | 0.48 | 36.6 | 9.55 | Moderate | 14.91 |
| | Example 6 | 0.48 | 37.8 | 6.51 | Moderate | 14.32 |
| | Example 7 | 0.48 | 38.4 | 6.28 | Moderate | 14.22 |
| | Example 8 | 0.48 | 38.6 | 5.74 | moderate | 14.18 |
| | Example 9 | 0.48 | 38.7 | 6.14 | Coarse | 14.22 |
| | Example 10 | 0.48 | 39.3 | 3.32 | Moderate | 14.34 |
| | Example 11 | 0.48 | 37.6 | 6.81 | Moderate | 14.38 |
| | Example 12 | 0.48 | 38.3 | 4.59 | Moderate | 14.19 |
| | Comparative Example 6 (L-580) | 1.0 | 37.6 | 8.01 | Moderate | 14.49 |
| (II) | Example 8-A | 1.6 | 25.2 | 7.5 | Fine | 8.79 |
| | Comparative Example 6 (L-580) | 1.6 | 23.9 | 10.44 | Fine | 9.02 |
| | Comparative Example 7 (L-600) | 1.6 | 24.8 | 7.87 | Moderate | 8.74 |
| | Comparative Example 8 (B-8123) | 1.6 | 24.8 | 7.87 | Coarse with Pinholes | 8.76 |

The comparison in Table 4 clearly shows that a hydroxyl-terminated polyether modified silicone surfactant of this invention Examples 6-12 can increase the potency and improve cell structure as the data of Table 4 (in Formulation 1) clearly shows. The Comparative Examples 6, 7, and 8, utilizing the commercial surfactants L-580, L-600 and B-8123, respectively, are inferior to surfactant Example 8-A of the present invention in respect of the occurrence of many pin holes defects or reduced fine cells in the ultra low density flexible slabstock foam as presented by the data of Table 4, i.e., Formulation II.

Preparation of flexible slabstock polyurethane foam: silicone surfactant Example 8-A was compared with Comparative Example 7 and 8 (i.e., L-600 and B-8123, respectively) in Formulation (III) and Formulation (IV). The results are displayed in Table 5 below.

TABLE 5

Formulation III and IV

| Foam Formulation | Surfactant | Dosage of Sur. (pphp) | Full Cure Height (cm) | Recession (%) | Density (kg/m³) | Comments |
|---|---|---|---|---|---|---|
| (III) | Example 8-A | 1 | 37.99 | 2.06 | 19.22 | Fine Cells |
|  | Comparative Example 7 (L-600) | 1 | 35.53 | 6.50 | 19.2 | Pinholes |
|  | Comparative Example 8 (B-8123) | 1 | 34.61 | 9.13 | 20.53 | Pinholes and Serious splitting |
| (IV) | Example 8-A | 2.5 | 24.45 | 2.04 | 10.54 | Fine Cells |
|  | Comparative Example 7 (L-600) | 2.5 | 23.48 | 5.41 | 11.04 | Splitting foam |
|  | Comparative Example 8 (B-8123) | 2.5 | 24.33 | 1.52 | 10.64 | Pinholes |

Examination of the data presented in Table 5 clearly shows that a hydroxyl-terminated polyether modified silicone surfactant Example 8-A of the invention can increase the full cure height of the foam with lower recession, while providing fine cell structure.

While the invention has been described with reference to a preferred embodiment, those skilled in the art will understand that various changes may be made and equivalents may be substituted for elements thereof without departing from the scope of the invention. It is intended that the invention not be limited to the particular embodiment disclosed as the best mode for carrying out this invention, but that the invention will include all embodiments falling within the scope of the appended claims. All citations referred herein are expressly incorporated herein by reference.

What is claimed is:

1. A polyurethane foam obtained from a foam forming composition comprising a silicone copolymer surfactant having the formula:

$MD_xD'_yM$, wherein,

M represents $(CH_3)_3SiO_{1/2}$, or $(CH_3)_2RSiO_{1/2}$

D represents $(CH_3)_2SiO_{2/2}$,

D' represents $(CH_3)RSiO_{2/2}$, x+y is 50 to 150; y is at least 3; the ratio of x to y is 3 to 15; and R is a polyether independently selected from the group consisting of:

i) at least one polyoxyalkylene moiety having the formula: $-C_nH_{2n}O(C_2H_4O)_a(C_3H_6O)_bR'$ and possessing a number average molecular weight from 2,300 to 5,500, wherein n is 2 to 4, a is a number such that the oxyethylene residue constitute 20 to 60 percent by the weight of the alkylene oxide residues of the polyoxyalkylene polyether, b is a number such that the propylene oxide residue constitute 80 to 40 percent by the weight of the alkylene oxide residues of the polyoxyalkylene polyether, and R' represents an alkyl group having 1 to 4 carbon atoms or $-C(O)CH_3$;

ii) at least one polyoxyalkylene moiety having the formula: $-C_{n'}H_{2n'}O(C_2H_4O)_{a'}(C_3H_6O)_{b'}R''$ and possessing a number average molecular weight from 800 to 2,200, wherein n' is 2 to 4, a' is a number such that the oxyethylene residues constitute 20 to 60 percent by weight of the alkylene oxide residues of the polyoxyalkylene polyether, b' is a number such that the propylene oxide residue constitute 80 to 40 percent by the weight of the alkylene oxide residues of the polyoxyalkylene polyether, and R'' represents an alkyl group having 1 to 4 carbon atoms or $-C(O)CH_3$; and, iii) at least one polyoxyalkylene moiety having the formula:

$-C_{n''}H_{2n''}O(C_2H_4O)_{a''}(C_3H_6O)_{b''}H$ and possessing a number average molecular weight of 1,400 to 2,300, n'' is 2 to 4, a'' is a number such that the oxyethylene residues constitute 20 to 60 percent by weight of the alkylene oxide residues of the polyoxyalkylene polyether, and b'' is a number such that the propylene oxide residue constitute 80 to 40 percent by the weight of the alkylene oxide residues of the polyoxyalkylene polyether, with the proviso that $MD_xD'_yM$ has at least one each of components (i), (ii), and (iii), where the blend number average molecular weight of the overall polyoxyalkylene polyethyer containing substitutents R in the composition is from 2,050 to 2,350 and component (iii) constitutes 10 to 60 mole percent of the total amount of polyether.

2. The polyurethane foam of claim 1 wherein a is a number that ranges form 10.5 to 75, and b is a number that ranges from 16 to 76.

3. The polyurethane foam of claim 1 wherein a' is a number that ranges from 4 to 30, and b' is an a number that ranges from 11 to 30.

4. The polyurethane foam of claim 1 wherein a'' is a number that ranges from 6 to 32, and b'' is a number that ranges from 10 to 32.

5. The polyurethane foam of claim 1 wherein component (i) is from 35 to 60 mole percent of the total amount of polyether and has a number average molecular weight of 2,300 to 4,000, and a weight ratio of oxyethylene/propylene oxide of 2 to 3; component (ii) is less than 30 mole percent of the total amount of polyether and has a number average molecular weight of 1,300 to 1,600 and a weight ratio of oxyethylene/propylene oxide of 2 to 3; and component (iii) is 10 to 60 mole percent of the total amount of polyether and has a number average molecular weight of 1,500 to 1,600 and a weight ratio of oxyethylene/propylene oxide of 2 to 3, with the proviso that x+y is 77 and the ratio x/y is 14.

6. The polyurethane foam of claim 5 wherein component (iii) is 20 to 40 mole percent of the total amount of polyether.

7. The polyurethane foam of claim 1 wherein the total amount of polyether has an average molecular weight from 2,000 to 2,400.

8. The polyurethane foam of claim 1 further comprising a diluent.

9. The polyurethane foam of claim 8 wherein the diluent is dipropylene glycol.

10. The polyurethane foam of claim 1 wherein the average oxyethylene/propylene weight ratio of the polyether is 2 to 3.

11. The polyurethane foam of claim 1 wherein the foam forming reaction mixture further comprises at least one polyol, at least one isocyanate source, at least one polyurethane catalyst, and, optionally, at least one additional component selected from the group consisting of filler, blowing agent, other polymer and/or copolymer, chain extender, crosslinker, reinforcement, pigment, tint, dye, colorant, flame retardant, antioxidant, antiozonant, UV stabilizer, anti-static agent, biocide and biostat.

12. The polyurethane foam of claim 11 wherein the polyol is at least one selected from the group consisting of polyether polyol, polyester polyol, polycaprolactone polyol, polycarbonate polyol, polybutadiene polyol, hydroxyl-terminated polyolefin polyols, graphed polyol, and polyol derived from a natural source.

13. The polyurethane foam of claim 12 wherein the grafted polyol is at least one selected from the group consisting of styrene/acrylonitrile (SAN) graphed polyether polyol, acrylonitrile (AN)-graphed polyether polyol, and graphed polyester polyol.

14. The polyurethane foam of claim 11 wherein the polyol is at least one selected from the group consisting of polyether-terminated polybutadiene or polyether-terminated polyols derived from a natural source.

15. The polyurethane foam of claim 11 wherein the isocyanate source is at least one selected from the group consisting of methanediphenyl diisocyanate (MDI), polymeric MDI, modified MDI, prepolymers of MDI, toluenediisocyanate (TDI), prepolymers of TDI, and modified TDI.

16. The polyurethane foam of claim 15 wherein isocyanate source is at least one selected from the group consisting of 4,4' methanediphenyl diisocyanate, 2,4' methanediphenyl diisocyanate, 2,2' methanediphenyl diisocyanate, 2,4-toluenediisocyanate and 2,6-toluene diisocyanate.

17. The polyurethane foam of claim 11 wherein the catalyst comprises at least one selected from the group consisting of organometallic catalysts, alkali metal carboxylates catalysts, heavy metal-based catalysts, triethylene diamine, tin-based, and tertiary amine urethane catalysts.

18. The polyurethane foam of claim 11 wherein the catalyst is at least one selected from the group consisting of nickelacetoacetonate, ironacetoacetonate, bismuth-based catalysts, zinc-based catalysts, potassium octoate, potassium acetate, sodium acetate, sodium octoate, and quaternary ammonium carboxylate.

19. The polyurethane foam of claim 1 wherein the foam has a density of 20 kg/m$^3$ or less.

20. The polyurethane foam of claim 1 wherein the foam has a density of 12 kg/m$^3$ or less.

* * * * *